UNITED STATES PATENT OFFICE.

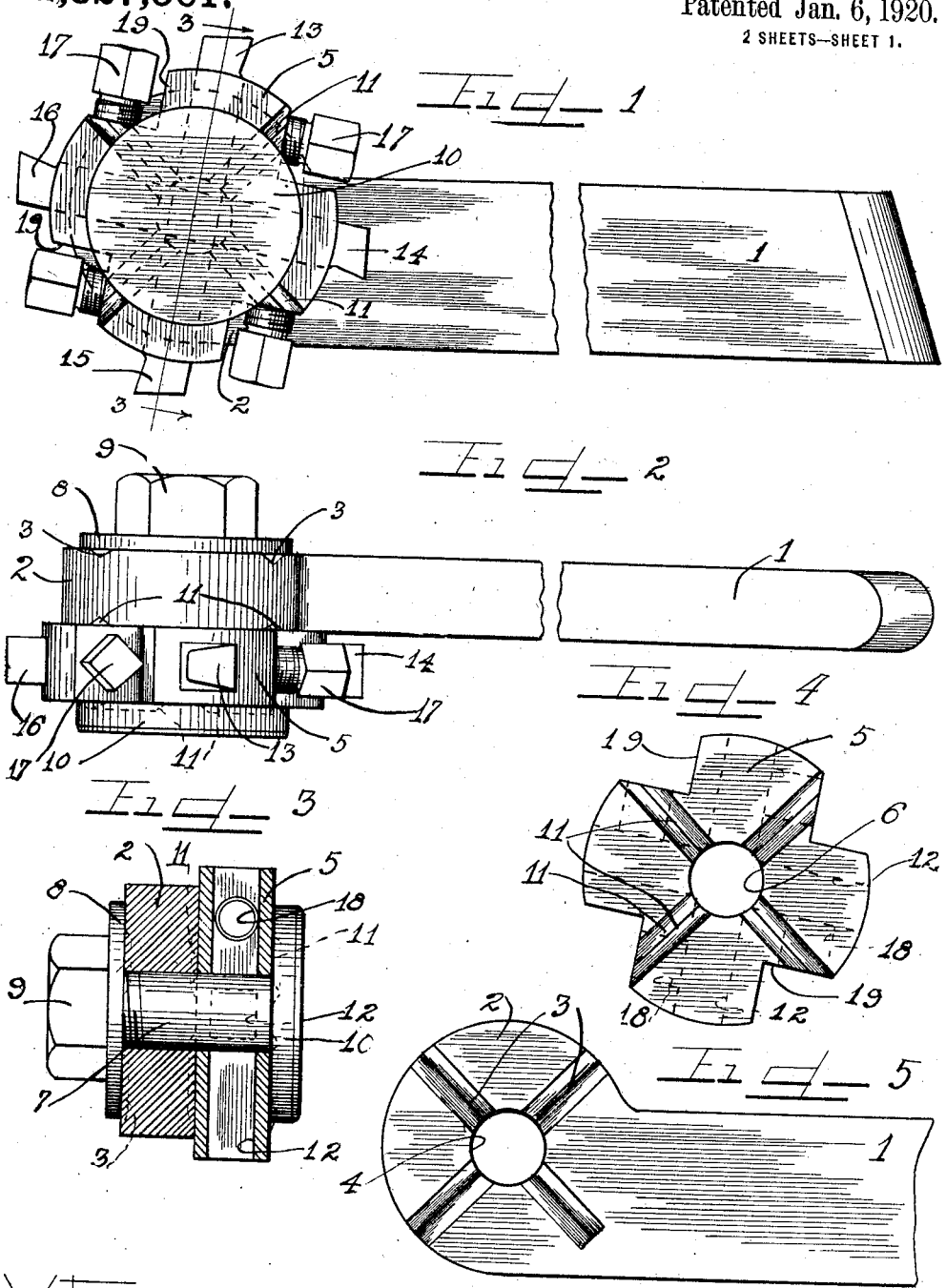

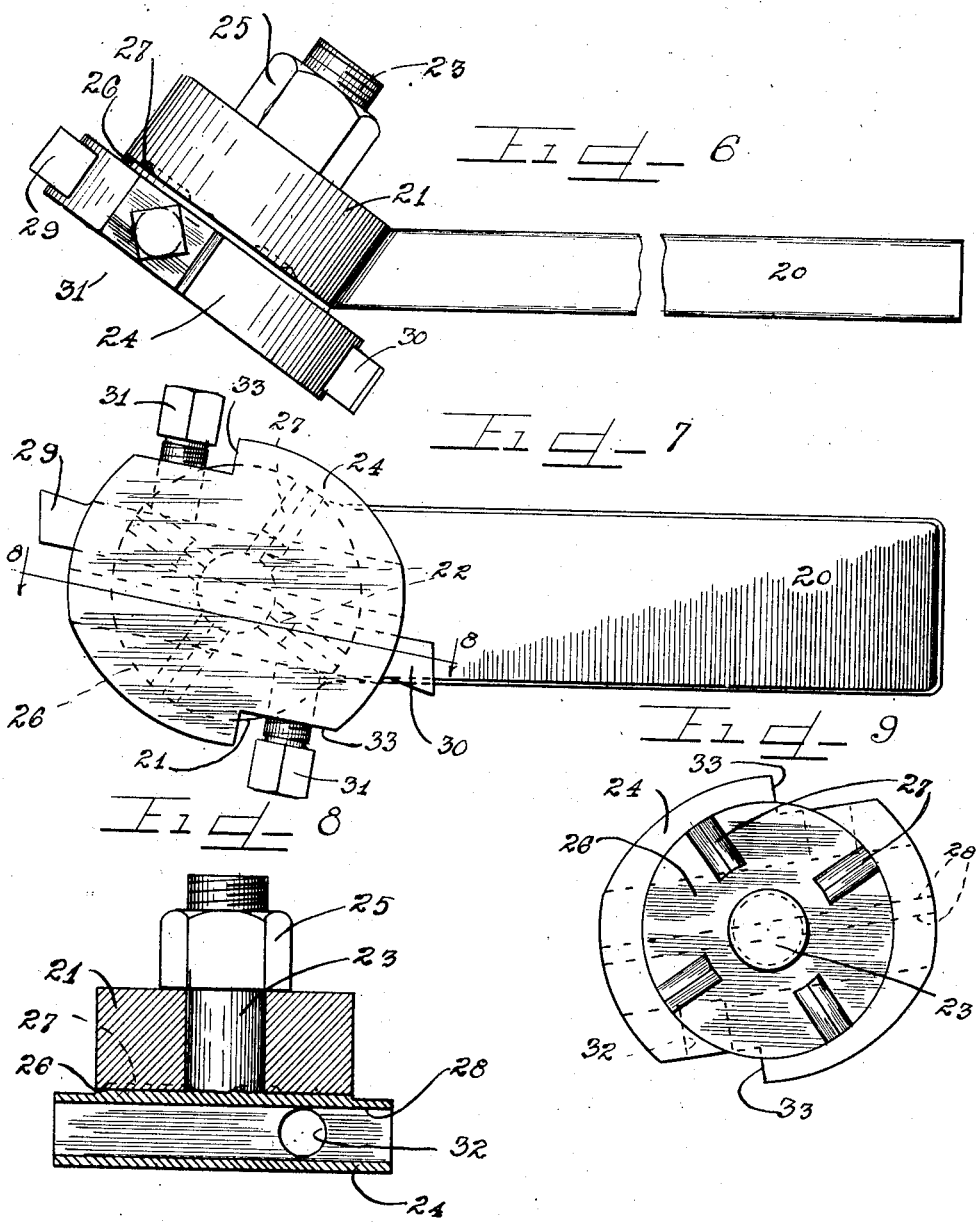

ARTHUR E. JOHNSON, OF CHICAGO, ILLINOIS, ASSIGNOR OF ONE-HALF TO WILLIAM B. PIERCE, OF CHICAGO, ILLINOIS.

TOOL-HOLDER.

1,327,561.     Specification of Letters Patent.     Patented Jan. 6, 1920.

Application filed May 14, 1917. Serial No. 168,450.

*To all whom it may concern:*

Be it known that I, ARTHUR E. JOHNSON, a citizen of the United States, and a resident of the city of Chicago, in the county of Cook and State of Illinois, have invented certain new and useful Improvements in Tool-Holders; and I do hereby declare that the following is a full, clear, and exact description of the same, reference being had to the accompanying drawings, and to the numerals of reference marked thereon, which form a part of this specification.

This invention relates to an improved tool holder for use on lathes, planers and shapers, adapted to carry more than one tool, and with the head in which the tools are carried, adjustable to permit any one of the tools to be swung into operative position so that roughing and finishing cuts upon similar pieces of work may be performed conveniently and rapidly without necessitating resetting of the tool other than to swing the tool head around to bring the tool desired into operative position.

It is an object therefore of this invention to construct a tool holder provided with a rotatable tool carrying head in which a plurality of tools may be mounted, and any one of the tools brought into position for use by rotating the head for the purpose of centralizing the same on said tool holder.

It is also an object of this invention to construct a tool holder comprising an adjustable head in which one or more cutting tools may be rigidly mounted, and with means releasably clamping the head rigidly in position with any one of the tools thereof disposed for a cutting operation. It is furthermore an important object of this invention to construct an adjustable tool holder adapted to carry a plurality of tools, each independently secured and independently adjustable in an adjustable member which, by adjustment, permits any one of the tools carried therein to be readily centralized or moved into operative position so that different cuts upon a piece of work may be performed without resetting the tool, by merely adjusting the member to bring the desired tool for the operation into cutting position.

Other and further important objects of the invention will be evident from the disclosures in the drawings and specification.

The invention (in a preferred form) is illustrated in the drawings and hereinafter more fully described.

On the drawings:

Figure 1 is a front elevational view of a tool holder embodying the principles of my invention.

Fig. 2 is a top view thereof.

Fig. 3 is a sectional detail on line 3—3 of Fig. 1, with parts omitted and parts shown in elevation.

Fig. 4 is an interior face view of the adjustable tool carrying head.

Fig. 5 is a fragmentary face view of the stationary head of the tool holder.

Fig. 6 is a top plan view of a modified form of a tool holder.

Fig. 7 is a front view thereof.

Fig. 8 is a section taken on line 8—8, of Fig. 7, with parts omitted and with parts shown in elevation.

Fig. 9 is an interior face view of the adjustable tool carrying head.

As shown on the drawings:

The reference numeral 1, indicates a shank or arm of a tool holder by which the tool holder is held secured in a lathe, planer, shaper, or other machine, and formed upon the outer end of said shank is a stationary head 2. As clearly shown in Fig. 5, said stationary head 2, is provided with radially directed V-shaped grooves or slots 3, in each surface thereof, disposed at right angles to one another, and with an aperture or hole 4, extending centrally or axially therethrough. Associated with said stationary head 2, is an adjustable or rotatable head 5, which, as shown in detail in Fig. 4, is provided with an axial aperture or hole 6, which is adapted to register with the hole 4, of the stationary head to permit a clamping bolt 7, to project therethrough and through a washer 8, on the opposite side of said head 2, so that a nut 9, may be engaged on the threaded end of said bolt 7, as shown in Figs. 2 and 3, to hold the adjustable head 5, tightly clamped in position upon the stationary head, by means of a comparatively large flat bolt head 10, the inner surface of which is provided with radially directed V-shaped grooves or slots disposed at right angles to one another.

Said adjustable head 5, is provided with a plurality of V-shaped radially extending tongues or ribs 11, on both surfaces thereof, adapted to engage or interlock with the grooves or slots 3, on either side of the stationary head 2, and with the grooves in the inner surface of the bolt head 10, to afford a means for readily centralizing said adjustable head to hold said adjustable head locked against rotation when fitted against the stationary head 2, and so held by the clamping nut 9. Extending radially through the adjustable head 5, are two passages 12, disposed at right angles to each other, for the reception of cutting tools, four of which may be carried at one time, such as shown in Fig. 1, and denoted respectively by the reference numerals 13, 14, 15 and 16. Each of said respective tools is independently held clamped in position in the adjustable head 5, by a set screw 17, which engages in a threaded drilling or aperture 18, disposed at right angles to the respective passages 12, the outer end of each of said apertures 18, terminating in one wall of one of a plurality of notches 19, formed by cutting away rectangular portions of the head 5, thus permitting the set screws 17, to be readily threaded into position.

In the modified form of the device shown in Figs. 6 to 9 inclusive, the reference numeral 20, indicates a shank or arm of a tool holder by which the tool holder is held secured in a lathe, planer, shaper or other machine, and integrally formed upon one end of said shank, at an angle thereto, is a stationary head 21, having radially directed V-shaped grooves or slots 22, formed in the outer surface thereof, disposed at right angles to one another as shown in dotted lines in Fig. 7. Drilled axially or centrally through the stationary head 21, is an aperture or hole through which an integral axial stud or threaded extension 23, of an adjustable or rotatable head 24, projects to receive a clamping nut 25, removably engaged on the threaded or inner end thereof, to hold the adjustable head 24, tightly clamped in position upon the stationary head 21.

The adjustable head 24, is elliptical in shape and has intgerally formed on the inner surface thereof, concentric with the integral stud bolt 23, a circular boss or raised portion 26, provided with a plurality of integral V-shaped radially extending tongues or ribs 27, disposed at right angles to each other and extending from the outer periphery of said boss to within a short distance of the stud bolt 23, as shown in Fig. 9. Said ribs 27, are adapted to engage in the grooves 22, of the stationary head 21, to hold said adjustable head from rotation when fitted against the stationary head, and so held by the clamping nut 25. Extending through the adjustable head 24, on opposite sides and parallel to the major axis of said adjustable head, are two passages 28, for the reception of cutting tools 29 and 30. Each of said cutting tools 29 and 30, is independently held clamped in position in the adjustable head, by a set screw 31, which engages in a threaded drilling or aperture, 32, disposed at right angles to the respective passages 28, the outer end of each of said apertures 32, terminating in one wall of one of two notches 33, formed on diagonally opposite sides of the minor axis of the adjustable head, by cutting away rectangular portions of said adjustable head, thus permitting the set screws 31, to be readily threaded into position to contact and securely hold the cutting tools in position.

The operation is as follows:

When certain operations are to be performed upon a piece of work, the various tools 13, 14, 15 and 16, are set to the proper position in the adjustable head 5, and the successive operations upon the work are then performed by each of said tools in succession. The respective tools are brought into position by loosening the nut 9, and shifting the adjustable head 5, outwardly from the stationary head 2, and then revolving the adjustable head through an angle of 90 degrees to bring the desired tool into proper cutting position of the tool, which position is assured, due to the fact that the ribs 11, on the adjustable head 5, engage in the grooves 3, on one side of the stationary head 2, said engaging ribs and grooves serving to readily centralize and prevent movement of the adjustable head 5, upon the stationary head when the adjustable head is clamped in position thereon by the clamping nut 9. The head 10, of the bolt 7, also has grooves therein which fit over the ribs 11, on the surface of the adjustable head adjacent the inner surface of said bolt head 10, to further insure holding of the adjustable head in a rigid position.

It will be noted by referring to Fig. 2, that both surfaces of the stationary head 2, are provided with grooves 3, and also that both surfaces of the adjustable head 5, are provided with ribs 11, thus permitting the adjustable head to be rigidly clamped in position with either face thereof adjacent either face of the stationary head 2, thereby affording a tool holder which may be used as either a right or left hand cutting tool, and also permitting the shank 1, to be inverted in its holder to properly position the cutting tools when the adjustable head is clamped in a position on the same side of the stationary head as shown in Fig. 2, but with the outer face of said adjustable head contacting the outer surface of the stationary head.

One of the important features of the tool holder is the fact that the grooves 3, in the stationary head 2, are so disposed that when the adjustable head 5, is clamped in position thereon the cutting tool disposed in cutting position, as for example tool 16, as shown in Fig. 1, is properly centralized and inclined upwardly or at an angle with respect to the upper surface of the shank 1. Of course said grooves may be so arranged to permit positioning of the cutter tools in any desired position.

In the modified form of the device disclosed in Figs. 6 to 9 inclusive, the adjustable head 24, having the stud bolt 23, integral therewith, is also adapted to be used as a right or left hand tool by simply inverting the shank 20, in its holder and inverting the cutter tools 29 and 30, in the adjustable head 24. In this form of construction the cutter tool when disposed in cutting position is inclined upwardly due to the arrangement of the grooves 22, in the stationary head 21. It will be clearly seen that in the modified form of the device that cutter tools of a greater length than those shown in Fig. 1, can be used if desired, since each of the passages 28, is adapted to hold but a single tool.

I am aware that various details of construction may be varied through a wide range without departing from the principles of this invention, and I therefore do not purpose limiting the patent granted otherwise than necessitated by the scope of the appended claims.

I claim as my invention:

1. In a tool holder of the class described, a shank, a stationary head integrally formed on one end thereof having radial grooves formed in opposite surfaces thereof, an adjustable head having passages therein associated with said stationary head, radially disposed ribs integrally formed on opposite faces thereof, the ribs on one surface of which engage in the grooves in one surface of said stationary head to hold said adjustable head from movement, a threaded bolt adapted to project through said adjustable and stationary heads, a flat head integrally formed on one end of said bolt, grooves formed in the inner surface thereof adapted when said bolt is in position to seat over the ribs on the other surface of said adjustable head to hold said bolt from rotation, a nut threaded on said bolt for securely clamping said movable and stationary heads together, cutter tools disposed in the passages of said movable head, and set screws engaged in said adjustable head for contacting said tools to secure the same in position.

2. In a tool holder of the class described, a shank, a stationary head integrally formed on one end thereof, a tool holding head adapted to be rotatably secured to either side of said head, about an axis offset with respect to the center line of the shank, one of said heads having radial grooves in opposite faces thereof, the other of said heads having radially arranged ribs on opposite faces thereof and means for clamping the tool head against either face of the stationary head in the desired angular position relatively thereto.

3. In a multiple tool holder the combination of a shank having a stationary head integrally formed on one end, an adjustable tool holder detachably secured to the stationary head and adapted to turn about a point thereon offset with respect to the center line of the shank and having a plurality of tool sockets, and means on both sides of each head enabling the adjustable head to be locked in a corresponding position on either side of the stationary head so that tools in the tool sockets occupy the same cutting position with reference to the work, at each side of the stationary head.

4. In a tool holder of the class described a shank, a stationary head integrally formed on one end thereof having a transverse aperture therein offset with respect to the center line of the shank, an adjustable head having an aperture therein adapted to register with the first aperture, a threaded bolt adapted to project through the apertures in said adjustable and stationary heads, said stationary head having radial grooves in opposite faces thereof, said adjustable head having radially arranged ribs integrally formed on opposite faces thereof for alternative engagement with said grooves when the adjustable head is pressed against the stationary head by said bolt, said adjustable head having tool receiving passages therein in a plane substantially perdendicular to the axis of the aperture in said head.

In testimony whereof I have hereunto subscribed my name in the presence of two subscribing witnesses.

ARTHUR E. JOHNSON.

Witnesses:
CHARLES W. HILLS, Jr.,
EARL M. HARDINE.